Patented Oct. 15, 1940

2,218,146

UNITED STATES PATENT OFFICE 2,218,146

CHEMICAL COMPOSITION

Robert E. Fothergill, Wilmington, Del., assignor to E. I. du Pont de Nemours & Company, Wilmington, Del., a corporation of Delaware No Drawing. Application March 14, 1938, Serial No. 195,921

7 Claims. (Cl. 106—40)

This invention relates to plasticized cellulose derivatives, and more particularly to plasticized cellulose mixed esters, and still more particularly to compositions of matter comprising cellulose acetate propionate and a tributyric acid ester of glycerol as plasticizer therefor.

Although a number of plasticizers have been suggested and used with cellulose mixed esters to give films and sheets which are tough at ordinary temperatures, these compositions all have the defect of being brittle at low temperatures of the order of −18° C. Even compositions such as cellulose acetate plasticized with tributyrin and cellulose acetate propionate plasticized with tripropionin, which bear close chemical relationship to the composition of this invention, show this defect. Up to the present time such a defect has not been extremely disadvantageous. However, with the present use of cellulose ester interlayers in safety glass, it is highly important to use an interlayer which retains its toughness at low temperature.

This invention therefore has as an object the preparation of cellulose mixed ester compositions which will form films or sheets which are extremely tough at low temperatures (such as −18° C.). A further object is to prepare a cellulose acetate propionate composition which can be laminated with glass to give safety glass having improved toughness at low temperatures. A still further object is the preparation of a cellulose acetate propionate composition containing as a plasticizer therefor a compound which can be prepared easily and economically. These and other objects will more clearly appear hereinafter.

These objects are attained according to the following invention which comprises broadly, incorporating a tributyric acid ester of glycerol in cellulose acetate propionate in amounts sufficient to yield a composition which can be made into transparent flexible films or plates characterized principally by extreme toughness at temperatures as low as −18° C.

This invention may be best understood by reference to the following illustrative examples in which the quantities of the materials are expressed as parts by weight.

Example I

To 100 parts of an acetone solution containing 15 parts of cellulose acetate propionate having 1.9 acetyl and 1.0 propionyl groups per glucose unit of the cellulose, were added 20.25 parts of tri-n-butyrin (135% of the cellulose ester), and the solution tumbled overnight. Films were prepared by spreading this solution on glass plates and the solvent was allowed to evaporate at room temperature in a cabinet containing trays of sulfuric acid. The films, which were about 0.005 inch thick, were stripped from the glass plates and seasoned for three days at 65° C., and one day at 25° C. and 50% relative humidity. The resulting films were clear, soft and pliable, and when tested at −18° C. gave an impact test of 0.5 inch with hammer I. The impact testing machine used in evaluating these plasticized films consisted essentially of a means for dropping an interchangeable hammer on a 3″ x 2″ film, folded (but not creased) lengthwise. The toughness is expressed as the length, in inches, of the crack produced in the test film—the shortest crack lengths indicate the toughest films. Hammer I is about three times as drastic as hammer II, and about three and one-half times as drastic as hammer IV.

Example II

Films were prepared in the same manner as that described in Example I from the same type of cellulose acetate propionate except that in this case the cellulose ester was plasticized with 150% (22.5 parts) of triisobutyrin. These films gave impact tests of 0 to 1.2 inches with hammer I at −18° C.

Films of the same type of cellulose acetate propionate used in Examples I and II plasticized with 135% of tripropionin were very brittle at −18° C. The impact test was 3+ inches with hammer IV. This illustrates the unexpected improvement in low temperature toughness obtainable by the use of the butyric acid esters of glycerol instead of the propionic acid ester of glycerol which has been described in the prior art.

Films of plastics-type cellulose acetate containing 50 parts of triisobutyrin per 100 parts of acetate, were prepared in the same manner as that described in Example I. The impast test was 2.8+ inches with hammer IV at −18° C. Acetate films containing more than 50 parts of plasticizer tended to be opaque and hence were wholly unsatisfactory. This illustrates the unexpectedness of the results of combining tributyric acid esters of glycerol with cellulose acetate propionate, specifically.

Example III

Films prepared in the same manner as that described in Example I, from 100 parts of an acetone solution containing 15 parts of a cellulose acetate propionate having 1.6 acetyl and 0.8 propionyl groups per glucose unit, and 20.25 parts (135% of the weight of cellulose ester) of triisobutyrin, gave an impact test of 1.8 inches with hammer I at —18° C.

*Example IV*

Using a procedure similar to that described in Example I, films were prepared from a cellulose acetate propionate containing 0.8 acetyl and 2.02 propionyl groups per glucose unit, plasticized with 100% of tri-n-butyrin (based on the weight of the cellulose ester). When tested after the usual seasoning process, these films did not crack when struck with hammer I at —18° C. At ordinary temperatures these films were soft and very pliable.

This type of cellulose acetate propionate when plasticized with the same quantity (100% of weight of cellulose ester) of tripropionin, forms films which give an impact test of 3+ inches with hammer IV.

*Example V*

A stable colloid was prepared from 150 parts of a cellulose acetate propionate containing 1.6 acetyl and 0.8 propionyl groups per glucose unit, 202.5 parts of triisobutyrin and 225 parts of acetone by mixing these materials in a Werner and Pfleiderer mixer for three hours. The colloid was allowed to stand overnight at room temperature and then heated to 60° C. and evacuated at a pressure of 5 to 7 inches of mercury for a few minutes to remove all gas bubbles. The warm colloid was then extruded into sodium chloride brine at 8° C., and having a density of 1.145. The extruded sheeting was seasoned overnight in brine and then dried for two hours at 65° C. The resulting sheets were clear and tough and had a thickness of about 0.025 inch, and were suitable for use as the interlayer in laminated glass.

It should be understood that the above examples are illustrative only, and that the invention is by no means limited to the exact conditions therein set out, but rather is susceptible to wide variation. Thus any acetone-soluble cellulose acetate propionate may be used in preparing the compositions of this invention. The number of acetyl and propionyl groups in the mixed ester may be varied from about 0.4 propionyl and 2.6 acetyl groups up to about 0.4 acetyle and 2.6 propionyl groups per glucose unit. In other words, the propionyl content of the mixed ester may vary from about 13% to about 87% of the total acyl content. Primary cellulose acetate propionates may be used. However, it is preferable to use those which have been partially hydrolyzed. The degree of hydrolysis of the cellulose acetate propionates may be varied widely without exceeding the scope of this invention. However, the use of mixed esters containing between 2.0 and 2.9 acyl (total acetyl and propionyl) groups per glucose unit of the cellulose molecule is preferred. Other specific types of esters besides those described in the examples, which may be used are: 0.63 acetyl and 1.9 propionyl; 1.4 acetyl and 1.4 propionyl; and 1.1 acetyl and 1.1 propionyl groups per glucose unit.

This invention covers compositions containing tributyric acid esters of glycerol in various proportions. The proportions of plasticizer may vary from 50 parts (based on 100 parts of cellulose acetate propionate) up to 150 parts or more, depending on the type of cellulose acetate propionate used in the composition and on the properties desired in the final product. For example, softer sheets of greater pliability may be obtained with any specified proportion of tributyrin with cellulose acetate propionates having greater proportions of propionyl or greater total degree of substitution. A range of from about 100 to about 150 parts of tributyric acid ester of glycerol in the composition preferred.

Various solvents may be used in preparing the compositions of this invention. While acetone is specified in the various examples given above, other solvents such as methyl ethyl ketone, ethyl acetate, chlorinated hydrocarbons such as methylene or ethylene chloride, acetone-alcohol mixtures, or chlorinated hydrocarbon-alcohol mixtures may be used. The amount of solvent used may also be varied over wide ranges, depending to a great extent on the method to be used in preparing the film or sheet.

The compositions of this invention may be formed into films, sheets, etc., by any of the usual procedures. The films may be made of any desired thickness. For example, a solution of the cellulose ester and plasticizer may be spread on any suitable support and the solvent evaporated from the composition by means of warm air. In another process a composition containing a small amount of solvent, for example 40 to 100 parts of solvent to 100 parts of cellulose ester, may be worked on rolls to remove the volatile solvent and then pressed into a solid cake from which sheeting, rods, or other shapes may be cut. In still another variation, the composition containing a small amount of solvent is extruded through a narrow slit into a coagulating bath consisting of sodium chloride brine or other suitable coagulating liquids. The extruded sheets are then seasoned by suitable means to remove all volatile solvents.

The compositions of this invention are particularly advantageous for use in the manufacture of films, sheets, rods, tubes, laminated glass, varnishes or lacquers, and the like.

The main advantage of this invention is that these compositions form films or sheets which are considerably tougher at low temperatures, such as —18° C., than compositions previously known. Comparative data are given in the examples for cellulose acetate propionates plasticized with tripropionin. Other data may also be given to show that the compositions of this invention are much tougher than cellulose acetate propionates plasticized with other compounds described in the prior art. For example, cellulose acetate propionate films of the type described in Examples I and II, plasticized with 100 or 125% (per cent based on weight of cellulose ester) of tributyl phosphate are quite brittle at —18° C. The test samples were completely cracked (3+ inches) when subjected to hammer IV in the impact test. Tough compositions cannot be obtained with higher glycerides such as the glycerol ester of 2-methylpentanoic acid because this glyceride is not compatible with cellulose acetate propionate in proportions as high as 100% of the weight of the cellulose ester. These data show that completely unexpected results are obtained by using the butyric acid esters of glycerol as plasticizers for cellulose acetate propionate.

Another advantage of this invention is that the butyric acid esters of glycerol can be prepared easily and economically from relatively cheap raw materials.

In the present description and claims, the expression "a tributyric acid ester of glycerol" is intended to include glycerides of both n-butyric and isobutyric acids.

The above description is for purposes of illustration only, it being understood variations and modifications coming within the spirit of the invention are to be included within the scope thereof as defined in the appended claims.

I claim:

1. A composition of matter consisting of 100 parts by weight of a cellulose acetate propionate and from about 50 to about 150 parts of a tributyric acid ester of glycerol, said composition being characterized by extreme toughness at a temperature of −18° C.

2. A composition of matter consisting of 100 parts by weight of a cellulose acetate propionate and from about 100 to about 150 parts of a tributyric acid ester of glycerol, said composition being characterized by extreme toughness at a temperature of −18° C.

3. A composition of matter according to claim 1 wherein the tributyric acid ester of glycerol is tri-n-butyrin.

4. A composition of matter according to claim 1 wherein the tributyric acid ester of glycerol is tri-iso-butyrin.

5. A tough, transparent, flexible film suitable as an interlayer in laminated glass consisting of 100 parts by weight of an acetone-soluble cellulose acetate propionate and from about 50 to about 150 parts of tributyric acid ester of glycerol as plasticizer therefor, said film being characterized by extreme toughness at a temperature of −18° C.

6. A film according to claim 5 wherein the tributyric acid ester of glycerol is tri-n-butyrin.

7. A film according to claim 5 wherein the tributyric acid ester of glycerol is tri-iso-butyrin.

ROBERT E. FOTHERGILL.